(12) United States Patent
Hulbert

(10) Patent No.: US 7,050,481 B1
(45) Date of Patent: May 23, 2006

(54) METHOD FOR IMPROVED EXTRACTION IN CDMA SYSTEMS

(75) Inventor: Anthony Peter Hulbert, Southampton (GB)

(73) Assignee: Roke Manor Research Limited, Romsey (GB)

( * ) Notice: Subject to any disclaimer, the term of this patent is extended or adjusted under 35 U.S.C. 154(b) by 0 days.

(21) Appl. No.: 09/830,466

(22) PCT Filed: Oct. 26, 1999

(86) PCT No.: PCT/GB99/03546

§ 371 (c)(1),
(2), (4) Date: Aug. 2, 2001

(87) PCT Pub. No.: WO00/25438

PCT Pub. Date: May 4, 2000

(30) Foreign Application Priority Data

Oct. 27, 1998 (GB) .................................. 9823439
Jun. 16, 1999 (GB) .................................. 9913872

(51) Int. Cl.
*H04B 1/19* (2006.01)
*H04B 7/216* (2006.01)

(52) U.S. Cl. ...................................... 375/144; 370/342
(58) Field of Classification Search ................ 375/144, 375/130, 147, 316, 346, 348, 278; 455/13.4; 342/378, 383; 370/320, 335, 342
See application file for complete search history.

(56) References Cited

U.S. PATENT DOCUMENTS

| 5,644,592 | A | | 7/1997 | Divsalar et al. | |
|---|---|---|---|---|---|
| 6,064,338 | A | * | 5/2000 | Kobayakawa et al. | 342/378 |
| 6,178,194 | B1 | * | 1/2001 | Vasic | 375/136 |
| 6,335,922 | B1 | * | 1/2002 | Tiedemann et al. | 370/335 |
| 6,507,568 | B1 | * | 1/2003 | Kumar et al. | 370/329 |

FOREIGN PATENT DOCUMENTS

WO    WO 95/34139    12/1995

* cited by examiner

*Primary Examiner*—Khai Tran
(74) *Attorney, Agent, or Firm*—Crowell & Moring LLP

(57) ABSTRACT

In a method for improving signal extraction in a code division multiple access (CDMA) telecommunications system, a first iteration of interference cancellation is performed on the basis of bit rates for every signal which are the same as those in a previous frame of the same signal. Filtered and down-converted signals are demodulated in Rake receivers to provide output signals corresponding to decision variables and channel estimates. The decision variables are limited and remodulated and respread prior to the signals being reconstructed using the channel estimates. The reconstructed signals are summed, and each signal is subtracted from the sum to provide an 'interference' signal which is then used to obtain the individual signals. Each signal is then demodulated a second time in another Rake receiver to provide a tentative DPDCH signal, a TFI signal, a TPC signal and a SNI signal. The TFI signal is processed to provide a signal indicative of the bit rate which is used to both decode the DPDCH signal providing a data output and to provide an estimate of the bit rate for a subsequent frame of the same signal.

37 Claims, 2 Drawing Sheets

METHOD FOR IMPROVED EXTRACTION IN CDMA SYSTEMS

The present invention relates to improvements in or relating to signal extraction, and is more particularly concerned with extracting a desired signal from a plurality of signals interfering with the desired signal.

BACKGROUND OF THE INVENTION

The universal mobile telecommunication system (UMTS) terrestrial radio access (UTRA) uses code division multiple access (CDMA) as its multiple access technique. On the uplink (mobile terminal to base station direction), non-orthogonal codes are used in combination with power control. However, because the codes are not orthogonal, the capacity of the uplink is limited by multiple access interference. The UTRA specification provides for the optional use of short codes to allow the use of various receiver techniques in the base station which rely on the fact that the multiple access interference is not noise but is, in fact, other signals. The receiver techniques which operate in this way are generically known as interference cancellation and joint detection.

One implementation of interference cancellation operates by first demodulating the data on all of the signals directed to the base station to form estimates of the data. Knowledge of these estimates of the data along with channel estimates allows the generation of delayed approximate replicas of the received signal from each of the mobile terminals. For each wanted signal, the replicas for the other signals are summed together and subtracted from a delayed version of the received composite signal. Thus, at this stage, the interference has been approximately cancelled for that signal. When demodulation (including despreading) is performed, the bit error rate (BER) should be reduced. The whole process can be repeated several times, each time using the improved estimates of the received data to construct the approximate replicas.

One implementation of joint detection operates by treating the sum of the signals as a composite signal having travelled over a path with components relating to the individual signal components. This path is then linearly or non-linearly equalised in order to permit demodulation of all of the data over all of the signals.

In both interference cancellation and joint detection techniques, it is necessary to have knowledge of the bit rates (and, therefore, the spreading factors) for each of the received signals. In UTRA frequency division duplex (FDD), the signal format consists of frames of 10 ms duration. There are two channels for each signal, namely, the dedicated physical control channel (DPCCH) and the dedicated physical data channel (DPDCH).

The DPCCH is a low power constant bit rate channel. It consists of 16 timeslots each comprising pilot symbols, forward error correction (FEC) encoded transport format indicator (TFI) data and transmit power control (TPC) data. The DPDCH consists of time interleaved, FEC encoded data. It has a bit rate which may vary from one frame to the next, the bit rate of which is carried by the TFI data in the DPCCH of the same frame. On the uplink, in a single spreading code transmission, the DPDCH is first spread to become the inphase (I) channel and the DPCCH is spread to become the quadrature (Q) channel. Overall scrambling is then applied to the combined signal.

The TFI data is spread out across the frame and cannot be reliably decoded until the whole of the current frame has been received. Thus the bit rate information, for each of the signals, is unavailable until the whole of the current frame has been received. This causes two problems:—

First, the reason for applying interference cancellation or joint detection is to increase the system capacity by allowing the reception of signals at a lower signal to noise plus interference ratio than would be possible without using it. This means that before the applicant of interference cancellation, it may be impossible to demodulate the TFI bits, leading to a deadlock situation. This is true even though the DPCCH and DPDCH are transmitted on nominally orthogonal (I and Q) channels since multipath will seriously degrade this orthogonality and because the different signals will be received at the base station with arbitrary mutual carrier phase.

Secondly, power control information is generated by making signal to noise plus interference measurements on the DPCCH within the time period of the frame. Thus, if interference cancellation or joint detection cannot be applied until the end of the frame, these measurements will need to be based on the signal to noise plus interference (SNI) without the benefit of interference cancellation or joint detection. If the power control measurement threshold is based on an adequate SNI ratio at this stages then the resultant SNI ratio after the operation of interference cancellation or joint detection will be higher than necessary. On the other hand, attempting to base the power control measurements on there being an adequate SNI ratio after the operation of interference cancellation or joint is problematic because: a) the SNI ratio at the measurement stage will be very low—probably too low to measure, and b) it is not possible to predict, a priori, how effective the interference cancellation or joint detection will be in any given slot.

U.S. Pat. No. 5,151,919 (Ericsson) provides a subtractive CDMA demodulation system which optimally decodes a coded system embedded in many other overlapping signals making up a received composite signal. A radio receiver correlated a unique code corresponding o the desired signal to be decoded with the composite signal. WO96/24206 (Nokia) provides a CDMA system in which several users communicate simultaneously on the same frequency band, and in which each user has its own spreading code. For reception of signals, sigal correlators use synchronisation with waveforms of different types to aid decoding.

SUMMARY OF THE INVENTION

It is therefore an object of the present invention to provide an improved method of extracting a signal which overcomes the problems mentioned above.

In accordance with one aspect of the present invention, there is provided, in a communication system employing coded signals, a method of extracting a desired coded signal from a composite signal comprising the desired signal and one or more interfering coded signals, the method comprising the steps of:—
a) receiving a composite signal;
b) processing, for each received signal code, individual signals in a first signal processor;
c) determining transport format indicator (TFI) signals using buffer and decoder circuits to provide a bit rate of a frame for at least one interfering signal;
d) dividing the TFI signal path into first and second signal paths;
e) wherein, in a first signal path TFI signals are passed via a latch to provide the first signal processor with a TFI signal, whereby to assign the bit rate determined for said last frame for the next frame; and wherein, in the second path TFI signals are passed to a further signal processor to adjust the bit rate of an output signal.

In accordance with a further aspect of the present invention there is provided, in a communication system employing coded signals, apparatus operable to extract a desired coded signal from a composite signal comprising the desired signal and one or more interfering coded signals, the apparatus comprising:— a) receiver means arranged to receive a signal;
b) a first signal processor for processing individual signals, for each received signal code;
c) buffer and decoder circuits for determining transport format indicator (TFI) signals, to provide a bit rate of a frame for at least one interfering signal;
d) a path divider for dividing the TFI signal path into first and second signal paths;

wherein, in the first signal path, TFI signals are passed via a latch, to provide the first signal processor with a TFI signal, whereby to assign the bit rate determined for said last frame for the next frame; and wherein, in the second path, TFI signals are passed to a further signal processor to adjust the bit rate of an output signal.

Other objects, advantages and novel features of the present invention will become apparent from the following detailed description of the invention when considered in conjunction with the accompanying drawings.

DETAILED DESCRIPTION OF THE INVENTION

In accordance with the present invention, a first iteration of interference cancellation or joint detection is performed on incoming signals on the basis that the bit rates for every signal are the same as they were for the same signal in the previous frame. Although this assumption may not be true for all of the signals, it should be true for the vast majority of signals whenever a large number of signals are present. If the frame rate is correct, for example, for 90% of signals, then nominally 90% of the interference would be cancelable. The unsuccessful attempt to cancel the remaining 10% of interference would add a further 10%, leaving the interference at 20% in the idea case. This provides, a 7 dB reduction in interference—a very useful start.

It will be appreciated that if the number of active signals is small then the operation of interference cancellation or joint detection will not be needed anyway.

As discussed above, in order to demodulate a CDMA signal effectively, the bit rate of that signal needs to be determined. However, due to the interference produced by the presence of other co-channel signals, it is necessary to cancel that interference from the signal before the bit rate can be determined. As discussed above, there are two main methods of eliminating the effects of that interference, namely, interference cancellation and joint detection. The present invention is described below with respect to both these techniques with reference to FIGS. 1 and 2 respectively.

Figure 1:
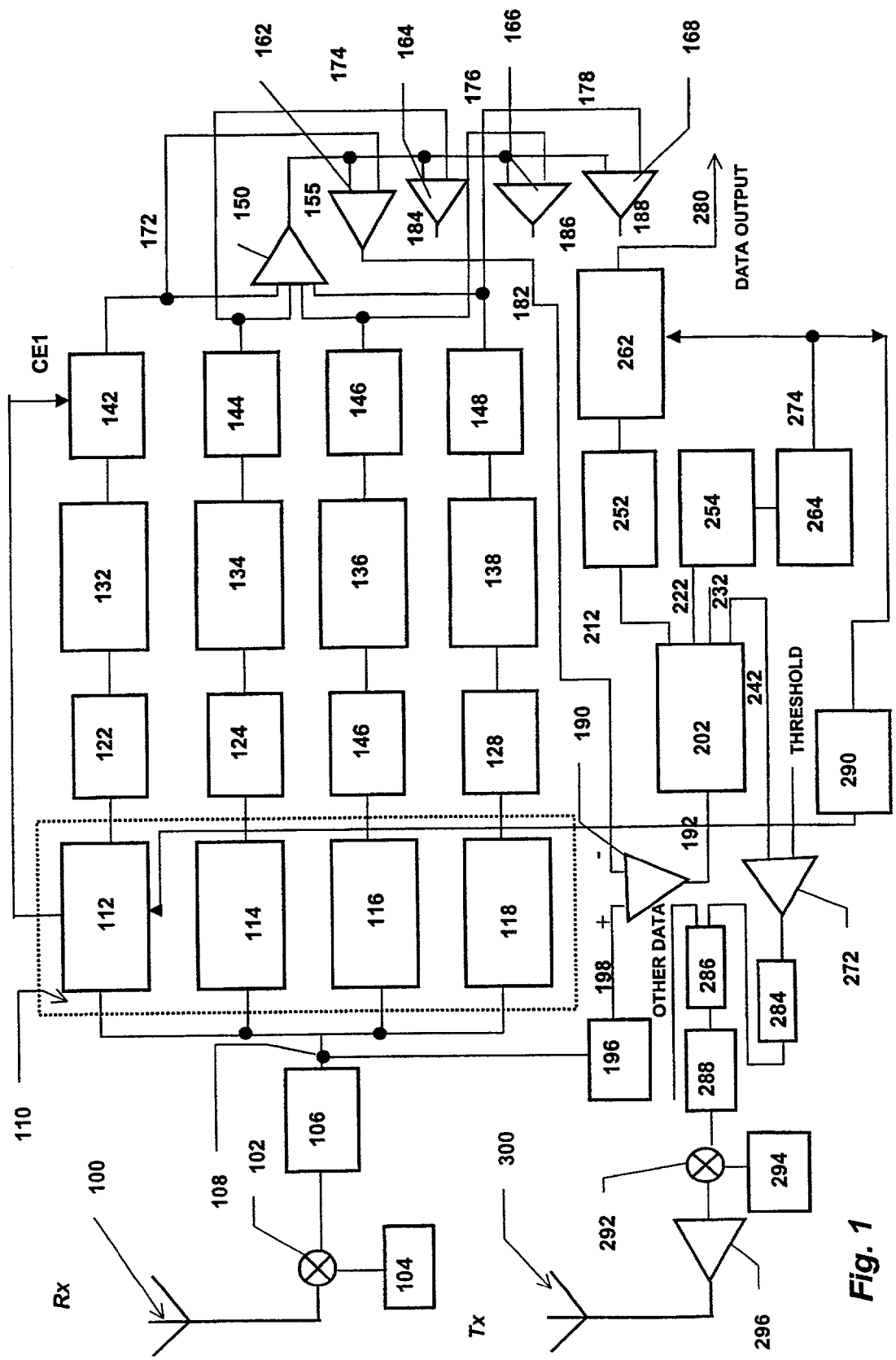
FIG. 1 illustrates a block diagram of one embodiment of a part of a base station of a telecommunication system in accordance with the present invention.

Referring initially to FIG. 1, a part of a base station is shown which comprises a receiving ($R_x$) antenna 100, a transmitting ($T_x$) antenna 300, and processing circuitry for down-converting received signals and up-converting signals for transmission. Antenna 100 receives a plurality of radio signals from a plurality of mobile terminals (not shown) in a telecommunications cell which includes the base station. The received signals are passed from the antenna 100 to a mixer 102 where they are down-converted using the output from a local oscillator 104. As is the case with CDMA, each radio signal has a unique code so that it can be distinguished from other radio signals received at the same time. The down-converted signals are passed to filter 106 and filtered output 108 is then passed to a bank 110 of Rake receivers. In the illustrated embodiment, four Rake receivers 112, 114, 116, 118 are shown, but it will readily be appreciated that any number of Rake receivers can be utilised according to the receiving capacity of the base station. Each Rake receiver 112, 114, 116, 118 operates on a different code so that each received signal can be individually processed. In this example, Rake receiver 112 operates on code 1, Rake receiver 114 operates on code 2, Rake receiver 116 operates on code 3, and Rake receiver 1118 operates on code 4.

Each Rake receiver 112, 114, 116, 118 receives all the plurality of filtered signals, but only demodulates and despreads the signal having the code associated with that receiver and outputs a decision variable signal in accordance with that demodulation and despreading. The decision variable signal from each Rake receiver 112, 114, 116, 118 is then fed to a respective one of decision devices 122, 124, 126, 128 which may be limiting devices. The limited outputs are then fed to respective remodulation/respreading units 132, 134, 136, 138 where the signals are remodulated and respread prior to being fed to respective channel reconstruct filters 142, 144, 146, 148.

Each Rake receiver 112, 114, 116, 118 also outputs a channel estimation signal CE—only the channel estimation signal CE1 from Rake receiver 112 being shown. Each channel estimation signal CE is input to a respective one of the channel reconstruct filters 142, 144, 146, 148 to enable reconstruction of each demodulated and despread signal. It is to be noted that, although only channel estimation signal CE1 is shown for clarity, it will be appreciated that Rake receivers 114, 116, 118 produce respective channel estimation signal CE2, CE3, CE4 (not shown) which are fed to corresponding reconstruct filters 144, 146, 148.

After the signals have been reconstructed, they are summed in summer 150 to form signal 155 which is an estimation of a delayed version of the filtered signal 108 input to the bank 110 of Rake receivers as described above. Signal 155 is then fed to a bank of subtractors 162, 164, 166, 168. It will be appreciated that a subtractor is provided for each signal which is to be extracted, and more subtractors will be required if more than four signals are to be extracted as described in the illustrated embodiment. Also fed to subtractors 162, 164, 166, 168, are respective signals 172, 174, 176, 178 which are tapped off the signals entering summer 150, each signal corresponding to the individual reconstructed signals. Subtractors 162, 164, 166, 168 subtract signals 172, 174, 176, 178 from signal 155 to provide output signals 182, 184, 186, 188 representing the 'interference' produced by the presence of the other signals. For example, output signal 182 corresponds to the incoming signal 108 (same as signal 155 as discussed above) minus the signal 172, that is, the signal having code 1. Similarly, output signal 184 corresponds to signal 108 minus signal 174 (code 2), output signal 186 corresponds to signal 108 minus signal 176 (code 3), and output signal 188 corresponds to signal 108 minus signal 178 (code 4).

For clarity, the subsequent processing of signal 182 is described, but it will readily be appreciated that signals 184, 186, 188 are processed in a similar way.

Signal 182 is then passed to a further subtractor 190 where signal 182 is subtracted from a delayed version of signal 108. As shown, signal 108 is fed to a delay circuit 196 to provide delayed signal 198. The delay introduced by the delay circuit 196 is equivalent to the time for signal 108 to be processed by the bank of Rake receivers 110, decision devices 122, 124, 126, 128, remodulation/respreading units 132, 134, 136, 138, channel reconstruct filters 142, 144, 146, 148, summer 150, and subtractors 162, 164, 166, 168. Subtractor 190 produces an output signal 192 which represents the signal having code 1. Similarly, output signals 184, 186, 188 are also passed to subtractors (not shown for clarity) where they are subtracted from delayed signal 198 to provide output signals representing signals having codes 2, 3, and 4.

Each output signal corresponding to each of the codes 2, 3, and 4 are also passed to respective further Rake receivers (not shown) and processed in identical fashion to provide the output signals described with reference to code 1 below.

Output signal 192 is then passed to a further Rake receiver 202 where it is demodulated and despread to produce output signals 212, 222, 232, 242. Output signal 212 corresponds to a tentative DPDCH signal which is passed to a DPDCH buffer 252. The tentative DPDCH signal comprises soft decision variables obtained on the basis of despreading according to the lowest currently available spreading factor. The output from buffer 252 is passed to circuit 262 where the bit rate is adjusted and the DPDCH decoded to provide an output data signal 280. However, circuit 262 cannot adjust the bit rate and provide the output data signal 280 without knowing the bit rate. Output signal 222 comprises a TFI signal which is passed to a TFI buffer 254. Output from buffer 254 is passed to circuit 264 where the TFI signal is decoded and the bit rate is determined. Output signal 274 from circuit 264 is passed to circuit 262 to adjust the bit rate and to enable the data signal 280 to be output. Output signal 274 is also passed to a latch 290 which is connected to Rake receiver 112 for inputting the bit rate determined from the last frame. This bit rate is then used as an estimate for the next frame.

Signal 232 comprises a TPC signal which is used to control the power which the mobile terminal needs to be transmitted to it by the base station.

Signal 242 comprises a SNI signal which is used to provide a measure of the signal to noise plus interference ratio being experienced for the particular signal being received on code 1. Signal 242 is compared with a threshold value in a comparator 272 to generate a series of downlink TPC bits indicating to the relevant terminal whether its power should be reduced or increased. The output from the comparator 272 is modulated in modulator 284, mixed with other data in multiplexer 286, spread in spreader 288, up-converted in mixer 292 fed by local oscillator 294, and amplified by amplifier 296 before being transmitted by antenna 300.

The other data input to multiplexer 286 will include similarly processed SNI signals from the other further Rake receivers (not shown) corresponding to codes 2, 3 and 4.

Figure 2:
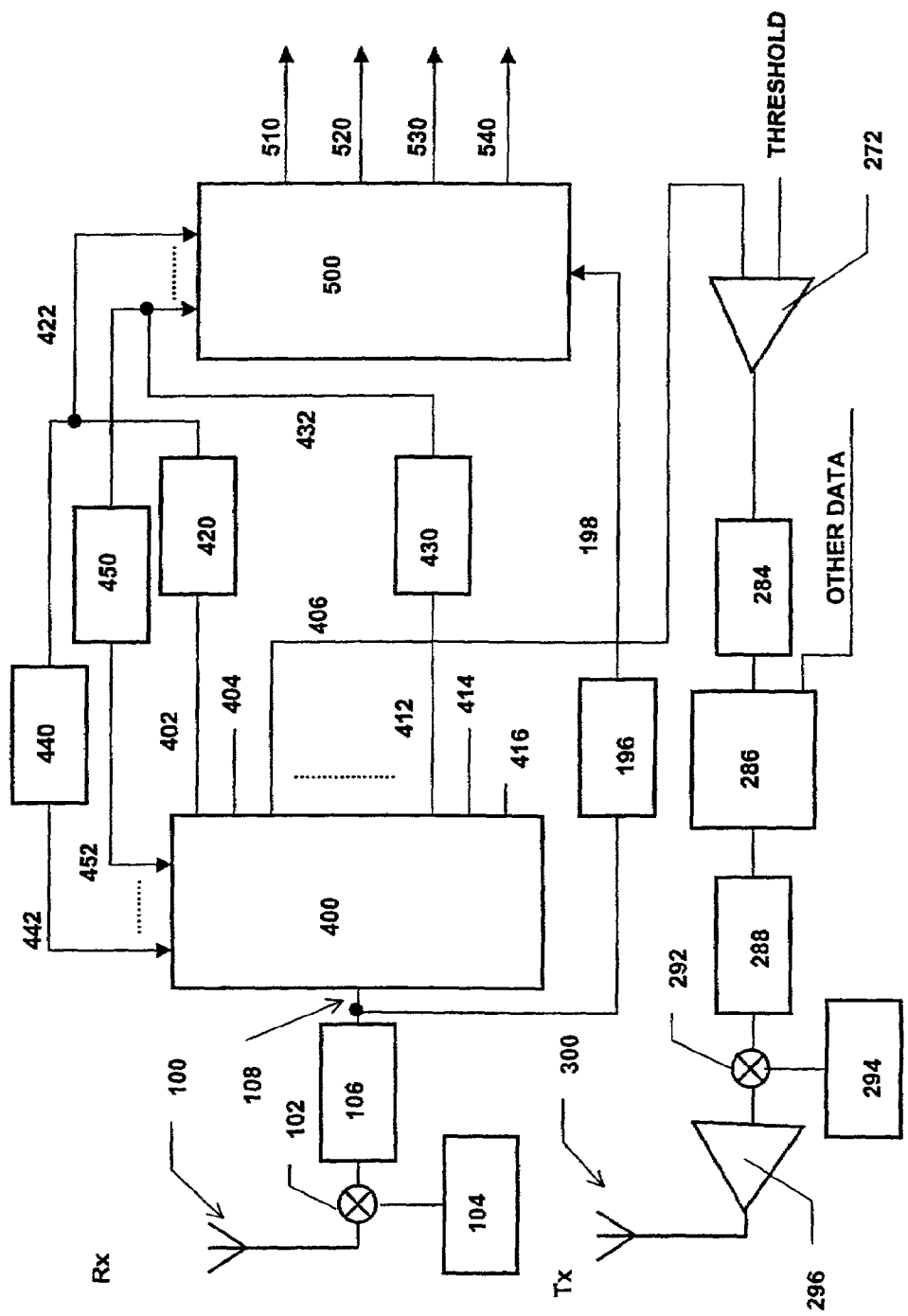
FIG. 2 illustrates a block diagram of another embodiment of a part of a base station in accordance with the present invention.

Referring now to FIG. 2, an arrangement utilising joint detection for removal of unwanted signals is shown. Components which have been previously described with reference to FIG. 1 are referenced the same.

In FIG. 2, a part of a base station is shown which comprises a receiving ($R_x$) antenna 100, a transmitting ($T_x$) antenna 300, and processing circuitry for down-converting received signals and up-converting signals for transmission. Antenna 100 receives a plurality of radio signals from a plurality of mobile terminals (not shown) in a telecommunications cell which includes the base station. For ease of explanation, the processing of the received signals is described with reference to four signals each having a unique code, for example, code 1, code 2, code 3, and code 4 as above. The received signals are passed from the antenna 100 to a mixer 102 where they are down-converted using the output from a local oscillator 104. As is the case with CDMA, each radio signal has a unique code so that it can be distinguished from other radio signals received at the same time. The down-converted signals are passed to filter 106 and filtered output 108 is then passed to a joint detection device 400. Device 400 processes the filtered output 108 to generate a TFI signal, a TPC signal and an SNI signal for each code—only code 1 and 4 are shown for simplicity, but it will readily be appreciated that codes 2 and 3 are identical.

For code 1, device 400 is shown as producing a TFI signal 402, a TPC signal 404 and a SNI signal 406. Similarly, for code 4, TFI signal 412, TPC signal 414 and SNI signal 416 are shown. TFI signals 402, 412 are passed to respective circuits 420, 430 where they are buffered and decoded. Output signals 422, 432 from circuits 420, 430 are passed to a second joint detection device 500. Signals 422, 432 are also passed to respective frame latch devices 440, 450, outputs 442, 452 therefrom being used to input bit rate information for joint detection device 400 for the next frame of respective signals having code 1 and code 4.

TPC signals 404, 414 are used to provide information for controlling the power which the mobile terminal needs to be transmitted to it by the base station. SNI signals 406, 416 are used to provide an indication to the mobile terminal of the interference being experienced.

For clarity, subsequent processing is only shown for signal 406. Signal 406 is compared with a threshold value in a comparator 272 and if the signal 406 is above the threshold, an output signal is provided which passes through switch 282, modulated in modulator 284, mixed with other data in multiplexer 286, spread in spreader 288, up-converted in mixer 292 fed by local oscillator 294, and amplified by amplifier 296 before being transmitted by antenna 300.

The other data input to multiplexer 286 will include similarly processed SNI signals from the other further Rake receivers (not shown) corresponding to codes 2, 3 and 4.

Filtered input signals 108 are also fed to a delay circuit 196. The delay of circuit 196 is chosen to compensate for delays introduced during joint detection in device 400 and buffering and decoding in circuits 420, 430. The delayed signal 198 provides the input to joint detection device 500 as shown. As discussed above, signals 422, 432 are used to provide bit rate information which is used to provide DPDCH signals 510, 520, 530, 540 from device 500.

In a further embodiment of the present invention (not illustrated), the first bank 110 of Rake receivers 112, 114, 116, 118 may be replaced with a joint detection device 400 to determine the bit rate so that the signals can be decoded in the further Rake receivers as described above.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. In a communication system employing coded signals, a method of extracting a desired coded signal from a composite signal comprising the desired signal and one or more interfering coded signals, the method comprising:
    a) receiving a composite signal;
    b) processing, for each received signal code, individual signals in a first signal processor;
    c) determining transport format indicator (TFI) signals using buffer and decoder circuits to provide a bit rate of a particular frame for at least one interfering signal;
    d) dividing a TFI signal path into first and second signal paths;
    e) wherein, in a first signal path, TFI signals are passed via a latch to provide the first signal processor with a TFI signal, whereby to assign the bit rate of said particular frame for a next frame; and
    f) wherein, in the second path, TFI signals are passed to a further signal processor to adjust the bit rate of an output signal.

2. A method according to claim 1, wherein the first signal processor comprises a bank of Rake receiver, each Rake receiver demodulating and despreading only signals having a code associated with the Rake receiver, each Rake receiver outputting a decision variable signal which is applied to a decision device which limits the output and, the decision device outputting to a remodulation/respread unit which provides a remodulated and respread signal to a channel reconstruction filter, the filter receiving a channel estimation signal (CE1) from said Rake receiver to provide a reconstructed signal.

3. A method according to claim 2, wherein the reconstructed signal is fed to a summer to provide a signal which is then subtracted in a bank of subtractors which subtracts a signal corresponding to the individual reconstructed signal.

4. A method according to claim 3, wherein the signal corresponding to the individual reconstructed signal is processed by a further Rake receiver to provide:
    i. a demodulated and despread signal to dedicated physical data channel (DPDCH) buffer; and
    ii. a transport format indicator (TFI) signal;
    wherein the TFI signal is buffered in TFI buffer, the bit rate is determined and passed to a bit rate adjuster circuit.

5. A method according to claim 2, wherein the further Rake receiver provides a transmit power control (TPC) signal whereby to enable a transmitter to transmit signals to the receiver at an appropriate power level.

6. A method according to claim 2, wherein the further Rake receiver provides a signal to noise plus a deference (SNI) signal.

7. A method according to claim 1, wherein the first signal processor comprises a first joint detection device, the joint detection device processing signals with respect to their signal codes whereby to determine TFI signals.

8. A method according to claim 7, wherein the first signal processor provides a plurality of further control signals for extracting said desired signal.

9. A method according to claim 8, wherein said plurality of further control signals comprise a transmit power control (TPC) signal and a signal to noise plus interference (SNI) signal.

10. In a communication system employing coded signals, apparatus operable to extract a desired coded signal from a composite signal comprising the desired signal and one or more interfering coded signals, the apparatus comprising:
    a) receiver means arranged to receive a signal;
    b) a first signal processor for processing individual signals, for each received signal code;
    c) buffer and decoder circuits for determining transport format indicator (TFI) signals, to provide a bit rate of a particular frame for at least one interfering signal;
    d) a path divider for dividing a TFI signal path into first and second signal paths;
    wherein, in the first signal path, TFI signals are passed via a latch, to provide the first signal processor with a TFI signal, whereby to assign the bit rate of said particular frame for a next frame; and
    wherein, in the second path, TFI signals are passed to a further signal processor to adjust the bit rate of an output signal.

11. Apparatus according to claim 10, wherein the first signal processor comprises a bank of Rake receiver, each Rake receiver operable to demodulate and despread only signals having a code associated with the Rake receiver, each Rake receiver being operable to output a decision variable signal which is applied to a decision device which is operable to limit the output and, the decision device being operable to output to a remodulation/respread unit which is operable to provide a remodulated and respread signal to a channel reconstruction filter, the filter being operable to receive a channel estimation signal (CE1) from said Rake receiver to provide a reconstructed signal which is fed to a summer to provide a signal which is then subtracted in a bank of subtractors which are operable to subtract a signal corresponding to the individual reconstructed signal.

12. Apparatus according to claim 11, comprising a further Rake receiver and a TFI buffer, wherein the further Rake receiver is operable to process the signal from the subtractor to provide;
    i. a demodulated and despread signal to dedicated physical data channel (DPDCH) buffer; and
    ii. a transport format indicator (TFI) signal;
    wherein the TFI signal is buffered in the TFI buffer, and the bit rate is determined and passed to a bit rate adjuster circuit.

13. Apparatus method according to claim 12, wherein the further Rake receiver is operable to provide a transmit power control (TPC) signal whereby to enable a transmitter to transmit signals to the receiver at an appropriate power level.

14. A method according to claim 12, wherein the further Rake receiver is operable to provide a signal to noise plus a deference (SNI) signal.

15. A method according to claim 10, wherein the first signal processor comprises a first joint detection device, the joint detection device being operable to process signals with respect to their signal codes whereby to determine TFI signals.

16. A method according to claim 15, wherein the first signal processor is operable to provide a plurality of further control signals for extracting said desired signal.

17. A method according to claim 16, wherein said plurality of further control signals comprise a transmit power control (TPC) signal and a signal to noise plus interference (SNI) signal.

18. A method of extracting a desired coded signal from a received composite signal comprising the desired coded signal and one or more interfering signals, the method employing coded signals in a communication system, said method comprising:
  a) determining a bit rate for at least one interfering signal in a particular frame;
  b) assigning the determined bit rate to at least one interfering signal in a subsequently received frame;
  (c) determining the at least one interfering signal in the subsequently received frame using the determined bit rate; and
  d) extracting the desired coded signal in the subsequently received frame by subtracting the determined at least one interfering signal from the composite signal in the subsequently received frame.

19. A method according to claim 18, further comprising:
  e) demodulating said subsequently received frame of said at least one interfering signal using said assigned bit rate to isolate said at least one interfering signal from other interfering signals.

20. A method according to claim 19, wherein step e) produces a plurality of control signals for extracting said desired signal.

21. A method according to claim 20, wherein said plurality of control signals comprises a transport format indicator (TFI) signal, a transmit power control (TPC) signal and a signal to noise plus interference (SNI signal).

22. A method according to claim 21, wherein step e) is carried out using interference cancellation.

23. A method according to claim 21, wherein step e) is carried out using joint detection.

24. A method according to claim 21, further comprising the steps of:
  determining an actual bit rate for said subsequently received frame of said at least one interfering signal; and
  g) demodulating said subsequently received frame of said at least one interfering signal using said actual bit rate to extract said desired signal.

25. A method according to claim 24, wherein step g) is carried out using joint detection.

26. A method according to claim 24, wherein step g) is carried out using at least one Rake receiver.

27. A method according to claim 26, wherein step g) produces a plurality of control signals for extracting said desired signal.

28. A method according to claim 27, wherein said plurality of control signals comprises a transport format indicator signal, a transmit power control signal and a signal to noise plus interference signal.

29. A method according to claim 28, wherein step a) comprises isolating said transport format indicator signal for said frame of said interfering signal and using said transport indicator signal to determine an actual bit rate for that frame.

30. An apparatus operable in a communications system to extract a desired coded signal from a received composite signal comprising the desired coded signal and one or more interfering signals, the apparatus comprising:
  a) a first signal processor operable to determine a bit rate for at least one interfering signal in a frame;
  b) a second signal processor operable to assign the determined bit rate to at least one interfering signal in a subsequently received frame;
  c) a third signal processor for determining the at least one interfering signal in the subsequently received frame using the determined bit rate; and
  d) subtracting means for extracting the desired coded signal in the subsequently received frame by subtracting the determined at least one interfering signal from the composite signal in the subsequently received frame.

31. An apparatus according to claim 30 wherein:
  the first signal processor comprises a bank of Rake receivers;
  each Rake receiver is operable to demodulate and despread only signals having a code associated with the Rake receiver;
  each Rake receiver is operable to output a decision variable signal which is applied to a decision device for limiting the output;
  the decision device is operable to output to a remodulation/respread unit for providing a remodulated and respread signal to channel reconstruction filter;
  the filter is operable to receive a channel estimation signal from said Rake receiver to provide a reconstructed signal which is fed to a summer to provide a signal which is then subtracted in a bank of substractors which are operable to subtract a signal corresponding to the individual reconstructed signal corresponding to the individual reconstructed signal.

32. An apparatus according to claim 31, comprising a further Rake receiver and a TFI buffer, wherein the further Rake receiver is operable to process the signal from the subtractor to provide:
  i. a demodulated and despread signal to dedicated physical data channel buffer; and
  ii. a transport format indicator (TFI) signal.

33. An apparatus according to claim 32, wherein the further Rake receiver is operable to provide a transmit power control signal whereby to enable a transmitter to transmit signals to the receiver at an appropriate power level.

34. An apparatus according to claim 32, wherein the further Rake receiver is operable to provide a signal to noise plus a deference (SNI) signal.

35. An apparatus according to claim 30, wherein:
  the first signal processor comprises a first joint detection device; and
  the joint detection device is operable to process signals with respect to their signal codes whereby to determine TFI signals.

36. An apparatus according to claim 35, wherein the first signal processor is operable to provide a plurality of further control signals for extracting said desired signal.

37. An apparatus according to claim 35, wherein said plurality of further control signals comprise a transmit power control (TPC) signal and a signal to noise plus interference (SNI) signal.

* * * * *